United States Patent [19]

Oliver

[11] Patent Number: 4,895,335
[45] Date of Patent: Jan. 23, 1990

[54] BOTTOM ADJUSTING LOAD SUPPORT

[76] Inventor: James Oliver, 28165-B Front St., #121, Temecula, Calif. 92390

[21] Appl. No.: 342,353

[22] Filed: Apr. 24, 1989

[51] Int. Cl.⁴ .............................................. B66F 3/10
[52] U.S. Cl. ................................ 248/354.3; 52/126.7; 254/100
[58] Field of Search .................. 248/354.3, 354.1, 357, 248/161, 405, 669, 125, 132, 157, 163.1, 178, 188.4; 254/98, 100, 102; 52/126.6, 126.7

[56] References Cited

U.S. PATENT DOCUMENTS

| | | | |
|---|---|---|---|
| 1,932,745 | 10/1933 | Lucker | 254/102 |
| 1,938,404 | 12/1933 | Shire | 254/102 |
| 2,814,099 | 11/1957 | Knittel | 254/100 |
| 3,222,030 | 12/1965 | Thorpe | 248/354.3 |
| 3,329,402 | 7/1967 | Grumman | 248/357 |
| 3,828,491 | 8/1974 | Koon | 52/126.7 |
| 4,581,863 | 4/1986 | Thaler | 248/354.3 |

FOREIGN PATENT DOCUMENTS

| | | | |
|---|---|---|---|
| 1058716 | 6/1959 | Fed. Rep. of Germany | 248/405 |
| 2034389 | 6/1980 | United Kingdom | 52/126.6 |

*Primary Examiner*—Ramon O. Ramirez
*Assistant Examiner*—Robert A. Olson
*Attorney, Agent, or Firm*—Calif Kip Tervo

[57] ABSTRACT

A height-adjustable load bearing support for attachment to a mobile home frame beam for supporting the home for occupancy has a bottom adjustment screw and is much better able to withstand lateral load forces, such as resulting from an earthquake. The support includes a stand, a vertical support shaft, and a bottom adjustment screw. The stand includes a base and legs which project upward to support a collar. A vertical shaft is supported by and within the collar and is slidable vertically. The vertical support member includes a side surface for bearing against the collar and an upper end disposed above the collar top end that includes a load support plate for supporting a frame beam. The load support plate includes tabs for attaching the plate to a beam such that the beam cannot slide off. The height of the vertical shaft is adjusted relative to the base by a screw connected to the lower end of the vertical shaft. Thus, compressive forces from vertical loads applied to the vertical shaft are transmitted to the base thru the adjustment screw, and shear and moment forces caused by lateral loads applied to the vertical shaft are transmitted to the base thru the collar and legs.

4 Claims, 2 Drawing Sheets

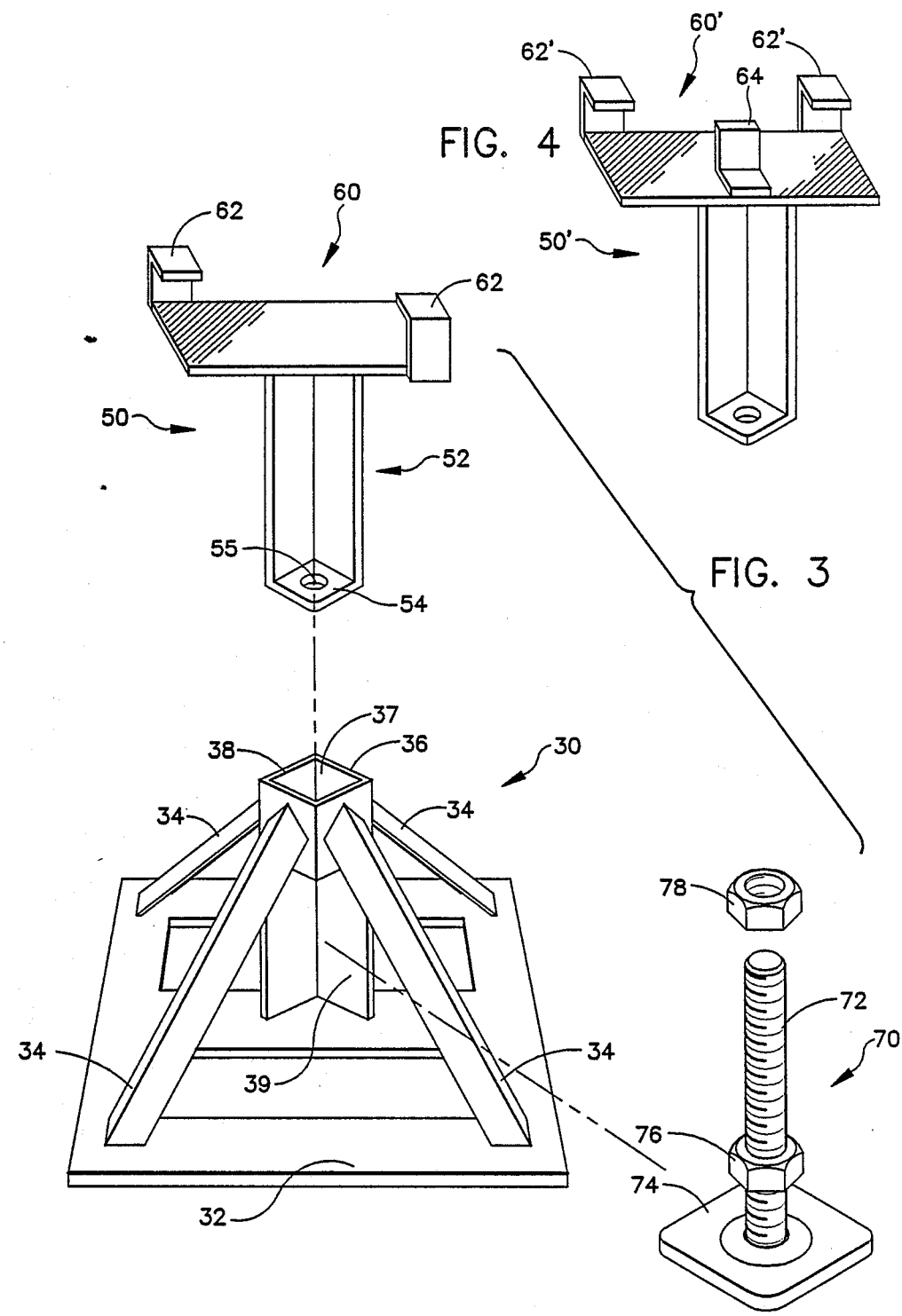

BOTTOM ADJUSTING LOAD SUPPORT

BACKGROUND OF THE INVENTION

1. Field of the Invention

This invention relates in general to load bearing supports and more particularly to an adjustable support for a mobile home.

2. Description of the Related Art

A mobile home typically includes a bottom framework of I-beams or channel beams. When the mobile home is parked for occupancy, these beams are rigidly supported so as to prevent any movement. One common support means, a top screw support, denoted generally as 10, is shown in FIG. 1. Top screw support 10 generally includes a stand 11 and an adjustable support head 15. Stand 11 includes a base 12 from which legs 13 extend in a pyramid shape to support at their apex a bearing 14 having a central bore (not seen). Support head 15 includes a threaded screw 16 which passes thru the central bore of bearing 14. Nut 18 is threaded on screw 16 and bears against bearing 14 such that turning nut 18 raises and lowers screw 16. A load support plate 17 on the upper end of screw 16 is placed under a frame beam. Typically, a plurality of top screw supports 10 would be placed under frame beams to support a mobile home.

Top screw supports 10 have a major problem; they tend to fail when subjected to lateral loads such as experienced during an earthquake. During an earthquake, load support plate 17 receives large lateral forces in additional to the standard compressive load forces. These lateral forces exert a shear force and a large moment force on screw 16 near nut 18 and bearing 14 which leads to failure by bending. Screw 16, has only a small cross-sectional moment of inertia to resist shear and bending forces and is additionally weakened by its threads, which are stress raisers. Support failure may lead to severe damage to the mobile home and injury to its occupants.

Also, it should be noted that with top screw support 10, legs 13 carry both the load forces (compressive) and the moment forces (compressive on one side and tensile on the other). These combined forces cause some prior art top screw supports to fail during earthquakes because of leg failure by buckling.

On prior art supports, load support plate 17 has a flat or nearly flat upper surface for placing under a frame beam. Consequently, during large lateral movement by the mobile home such as because of an earthquake of toronado, the beam may simply slide off the support plate.

Therefore, it is desirable to have an adjustable load bearing support for a mobile home that is much more capable of withstanding lateral loading than prior art supports.

It is additionally desirable that such an improved support should positively attach to the frame beams to prevent disengagement during lateral movement.

SUMMARY OF THE INVENTION

According to the invention, an adjustable load bearing support for attachment to a mobile home frame beam for supporting the home for occupancy has a bottom adjustment screw and is much better able to withstand lateral load forces, such as those resulting from an earthquake. The support includes a stand, a vertical support shaft, and a bottom adjustment screw. The stand includes a base and legs which project upward to support a collar. A vertical shaft is supported by and within the collar and is slidable vertically. The vertical support member includes a side surface for bearing against the collar and an upper end disposed above the collar top end, including a load support plate for attachment to a frame beam.

The height of the vertical shaft is adjusted relative to the base by a screw connected to the lower end of the vertical shaft. Thus, compressive forces from vertical loads applied to the vertical shaft are transmitted to the base thru the adjustment screw and shear and moment forces caused by lateral loads applied to the vertical shaft are transmitted to the base thru the collar and legs.

Other features and advantages of the invention will become apparent upon a reading of the following detailed description together with the drawings, in which like reference numerals refer to like parts throughout.

BRIEF DESCRIPTION OF THE DRAWING

FIG. 3 is an exploded perspective view of the bottom screw support of FIG. 2.

FIG. 4 is a perspective view of an alternate embodiment of the support head of FIG. 3.

DETAILED DESCRIPTION OF THE INVENTION

Figure 1:
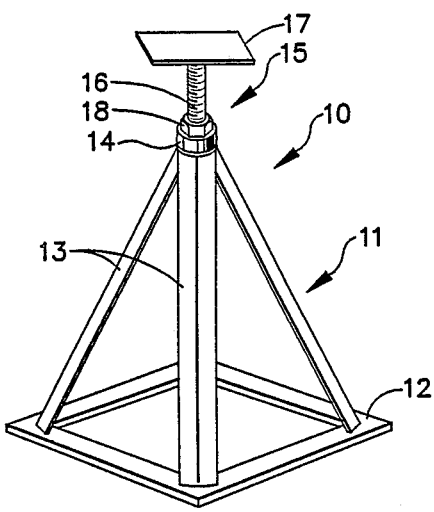
FIG. 1 is a perspective view of a typical prior art support.
Figure 2:
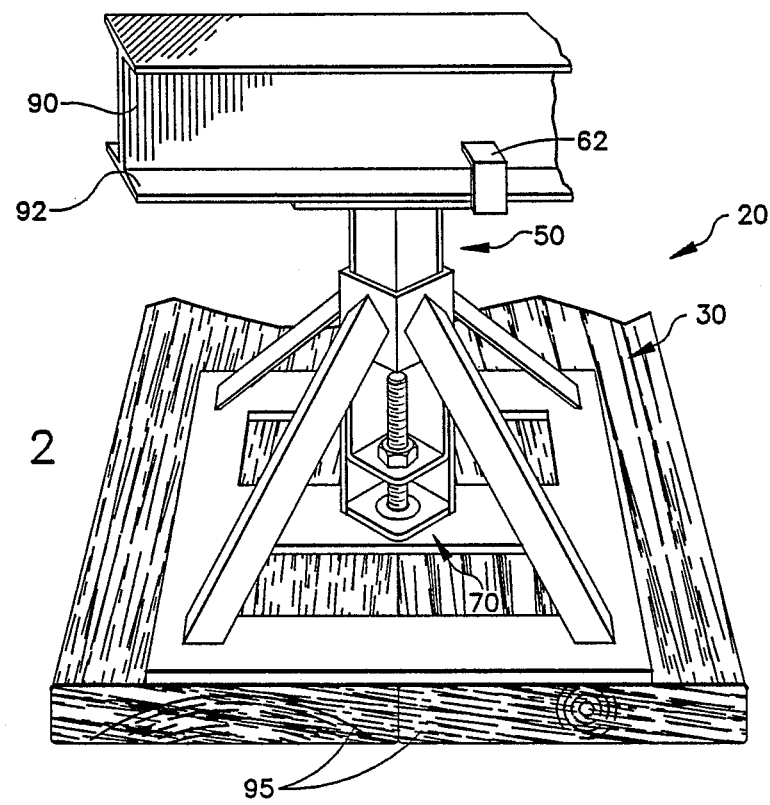
FIG. 2 is a perspective view of an exemplary embodiment of the bottom screw adjustable load bearing support of the present invention shown attached to a frame I-beam.

With reference once again to the drawing, and more particularly to FIG. 2 thereof, there is shown a perspective view of an exemplary embodiment of the bottom screw load support, denoted generally as 20, of the present invention as it is attached to and supports a mobile home frame beam, such as I-beam 90. Support 20 sits atop thick wooden planks 95 which act as a weight diffusion device.

In the following description of the exemplary embodiment, all of the elements are made of steel, unless otherwise noted.

Support 20 generally comprises a stand, denoted generally as 30, a vertical support member, such as support head, denoted generally as 50, and support head height adjustment means, denoted generally as 70.

Turning now to FIG. 3, these components can be seen in greater detail. Stand 30 comprises a base 32 for providing structural integrity and for spreading the load to the surface below the support 20. In the exemplary embodiment, base 30 is one-quarter inch thick and is eighteen inches square. Four legs 34 extend upward from the corners of base 30 forming pyramid shape and supporting at their apex a collar 36. Legs 34 are L-shaped in cross-section, three-sixteenths inch thick with one and one-half inch sides. Legs 34 are attached to base 32 and to collar 36 by welding.

Collar 36 is a square tube with one-quarter inch thick walls three inches on a side and five inches in length having a central bore 37 with a vertical axis and having a top end 38. In the exemplary embodiment, vertical leg 39 attaches to collar 36 and to base 32 and provides additional vertical support to collar 36.

Support head 50 includes a vertical shaft portion, denoted generally as 52, and a top support plate, denoted generally as 60. Vertical shaft portion 52 is slidably mounted in collar 36. Shaft 52 includes means on its lower end, such as adjustment plate 54, for cooperating in the height adjustment of the shaft. Adjustment plate 54 includes a central bore 55 for receiving height adjustment screw 72.

Top support plate 60 is securely mounted, such as by welding, to the top of shaft 52 for providing a larger load bearing surface to a frame beam. Preferrable, the top support plate includes means for attaching the plate to the beam to be supported. To accomplish this, the top support plate 60 depicted in the exemplary embodiment of FIG. 3, includes a flat central portion and an opposing tab 62 on each end for attachment to a I-beam lower flange members 92. Such an attachment is illustrated in FIG. 2. To attach support plate 60 to I-beam 90, load support 20 is rotated so that the bottom flanges 92 of I-beam 90 pass thru the flat central portion of top support plate 60. Support 20 is then rotated so that tabs 62 fit over the bottom flanges 92 as shown in FIG. 2. The beam 90 can no longer slide off top support plate 60.

FIG. 4 illustrates an alternate embodiment of top support plate 60' for attachment to an L-beam or channel beam having only one flange. In this embodiment, two tabs 62' are positioned on one side of top plate 60' and a projection 64 is disposed in opposition. For attachment, tabs 62' are hooked over the horizontal flange and support 20 swung so that projection 64 bears against the descending web of the beam. Of course, other configurations of tabs and projections may be used to accomplish this purpose.

Height adjustment means 70 includes screw 72, bottom plate 74, height adjustment nut 76, and securing nut 78. Screw 72 is seven-eighths inch in diameter and has eleven threads per inch. Bottom plate 74 is attached to screw 72 such as by welding. Bottom plate 74 holds screw 72 upright for ease of use and acts as a force diffuser to the support base. Screw 72 passes thru bore 55 in vertical shaft adjustment plate 54 and adjusting nut 76 is turned to bear against the lower surface of adjustment plate 54 and adjust the height of shaft 50 and consequently the height at which the fame beam will be supported. Securing nut 78 is attached to screw 72 above adjustment plate 54 to hold the assembly together.

Collar 36 allows only vertical movement of shaft 52. At times, such as an earthquake, large lateral loads may be exerted on top support plate 60. These loads are translated into a shear force and a moment force which are countered by collar 36 and legs 34 so that only the compressive load forces are handled by screw 72. Shaft 52 is much better able to carry the large shear and moment forces because it has much larger moment of inertia in cross section than does screw 72 and it is not weakened by threads. Of course, collar 36 may be of a different shape and and still accomplish its intended purpose of providing a bearing surface to counter the shear and moment forces.

From the foregoing description it is seen that the invention provides a simple, efficient, and reliable manner of removing from the adjustment screw the shear and moment forces caused by lateral loads to the top support plate and also prevents the supported beam from sliding off the support.

Although particular embodiments of the invention has been illustrated and described, various changes may be made in the form, construction, and arrangement of the parts herein without sacrificing any of its advantages, and it is understood that all matter herein is to be interpreted as illustrative and not in any limiting sense, and it is intended to cover in the appended claims such modifications and changes as come within the true spirit and scope of the invention.

Having described my invention, I now claim:

1. A load bearing support comprising:
a collar having a vertical axis and a top end;
a stand including:
  a base; and
  leg means connected to said base, extending upward and forming a pyramid for supporting at its vertex said collar top end above said base;
  a vertical leg means connecting said collar to said base;
a vertical support member supported in a vertical position by and within said collar for vertical movement within said collar; said vertical support member including:
  an upper end disposed above said collar top end including load support means for supporting a load; and
  a lower end;
means for preventing said vertical support member from rotating within said collar; and
height adjustment means connected to said vertical support member lower end for adjusting the height of said vertical support member relative to said base; such that compressive forces from vertical loads applied to said load support means are transmitted to said base thru said adjustment means and such that forces caused by lateral loads applied to said load support means are transmitted to said base thru said collar and said legs.

2. The support of claim 1 wherein:
said load support means is a horizontal, elongate plate having a longitudinal axis and includes means for attachment to a coach frame beam; said attachment means comprising a plurality of tab means extending upward from said plate, one or more of said tab means for extending over the top of a coach beam bottom flange upon rotation of said plate such that said vertical support member can be attached to a coach beam and can hang from the beam such that the longitudinal axis of said plate is aligned with the longitudinal axis of the beam.

3. In combination with a coach having a frame beam having a longitudinal axis and a lower flange, a support for attachment to said coach frame beam for partially supporting said coach; said support comprising:
a collar having a vertical axis and a top end;
a stand including:
  a base; and
  leg means connected to said base, extending upward and forming a pyramid for supporting at its vertex said collar top end above said base;
a vertical support member supported in a vertical position by and within said collar for vertical movement within said collar; said vertical support member including:
  an upper end disposed above said collar top end including support head means for supporting a load; said support head means including attachment means for attaching said head to said coach beam; wherein said support head means is a horizontal, elongate plate having a longitudinal axis and said attachment means comprises a plurality of tab means extending upward from said plate, one or more of said tab means being an inverted L-shape for extending over the top of a coach beam bottom flange upon rotation of said plate such that said vertical support member can be attached to said beam such that the longitudinal axis of said plate is aligned with the longitudinal axis of said beam and can hang from said beam; and a lower end; and means for preventing said vertical support member from rotating within said collar; and height adjustment means connected to said vertical support member lower end for adjusting the height of said vertical support member relative to said base; such that compressive forces from vertical loads applied to said support head means are transmitted to said base thru said adjustment means and such that forces caused by lateral loads applied to said load support means are transmitted to said base thru said collar and said legs.

4. The support of claim 3 further including:

vertical leg means connecting said collar to said base for resisting moment forces on said collar resulting from lateral loads on said load support means.

* * * * *